J. A. JONES.
SIGNALING SYSTEM FOR RAILWAYS.
APPLICATION FILED NOV. 9, 1908.
974,800.
Patented Nov. 8, 1910.
5 SHEETS—SHEET 1.
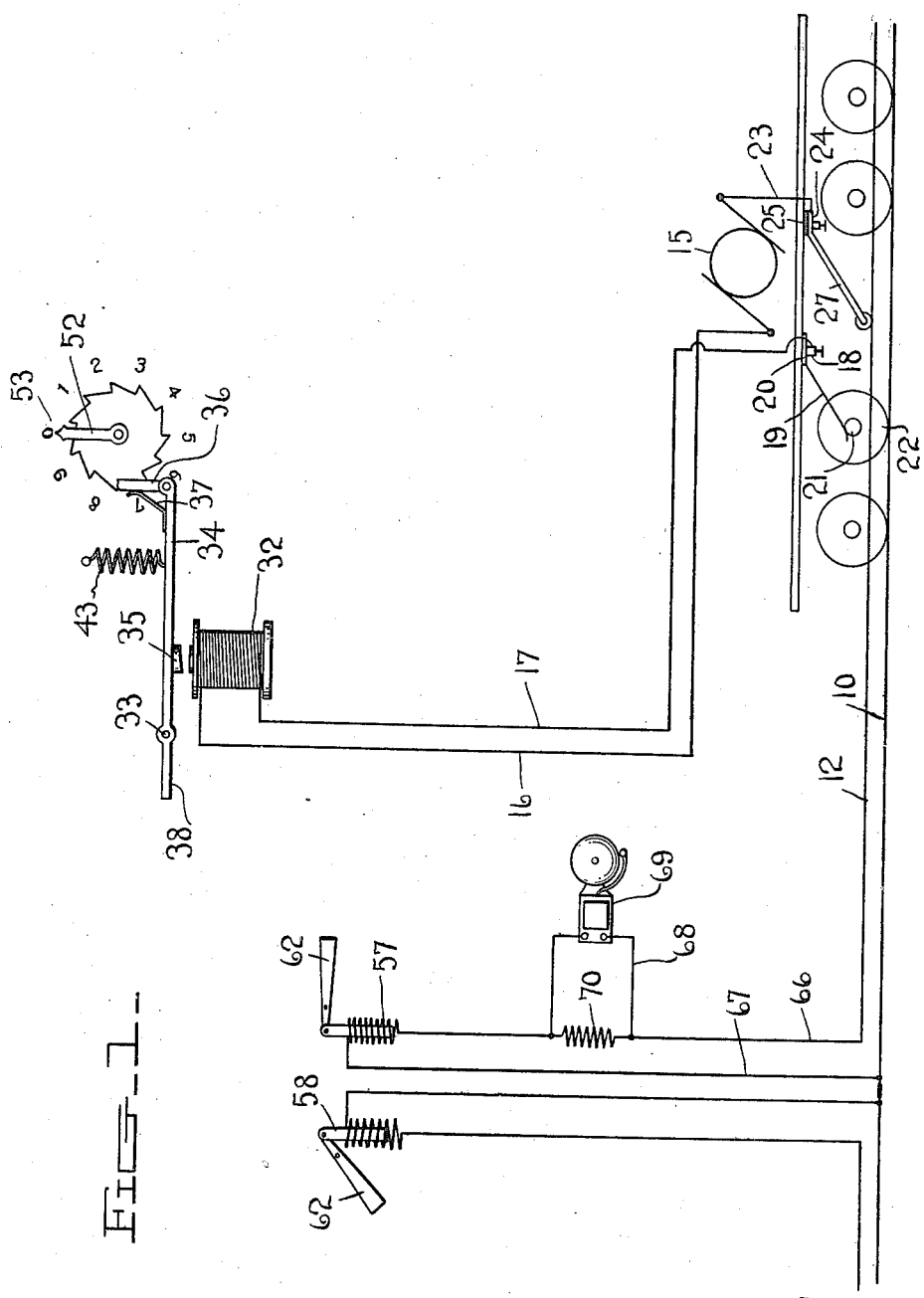
Witnesses
L. B. James
Inventor
James A. Jones
Attorneys

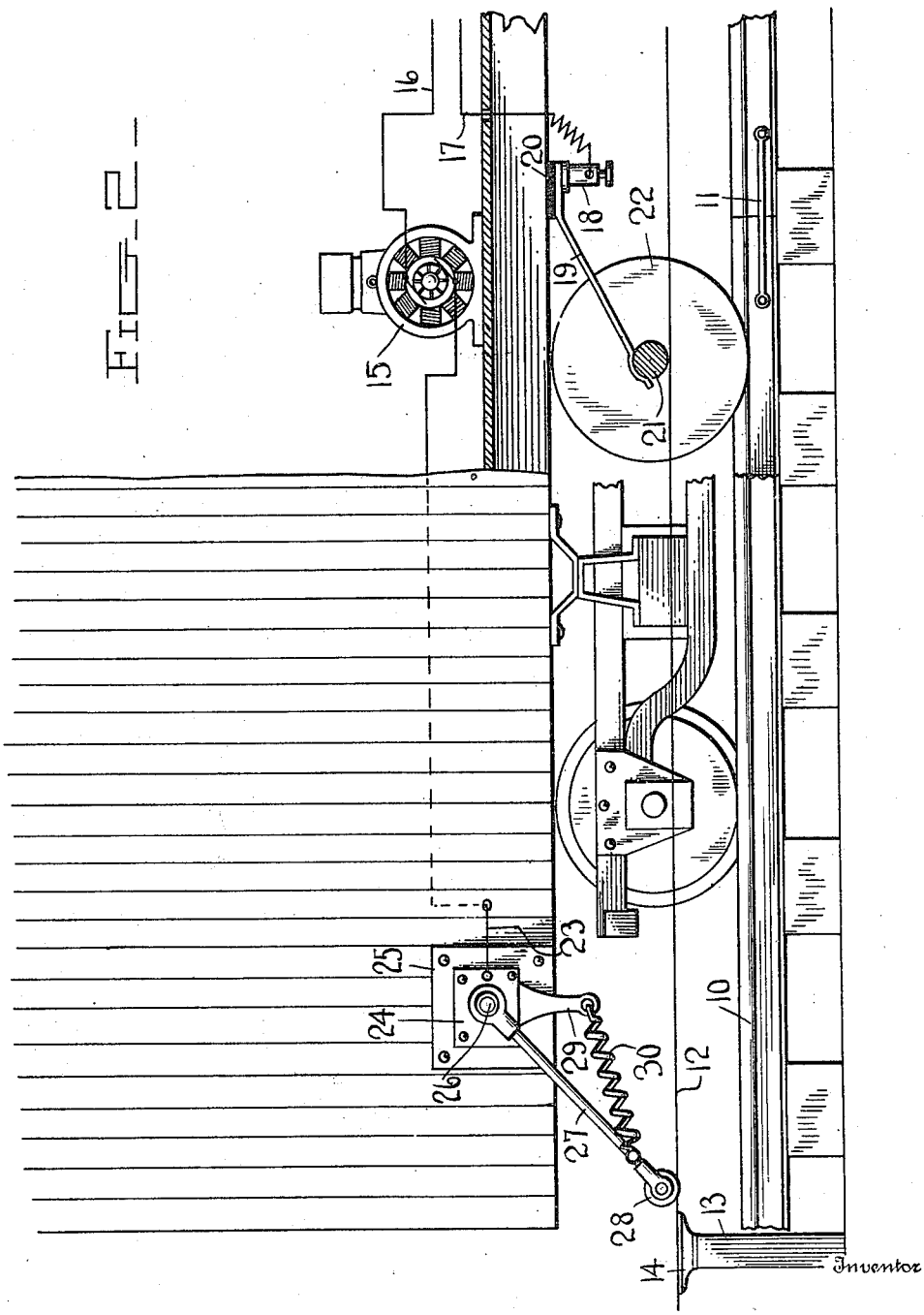

J. A. JONES.
SIGNALING SYSTEM FOR RAILWAYS.
APPLICATION FILED NOV. 9, 1908.
974,800.
Patented Nov. 8, 1910.
5 SHEETS—SHEET 3.
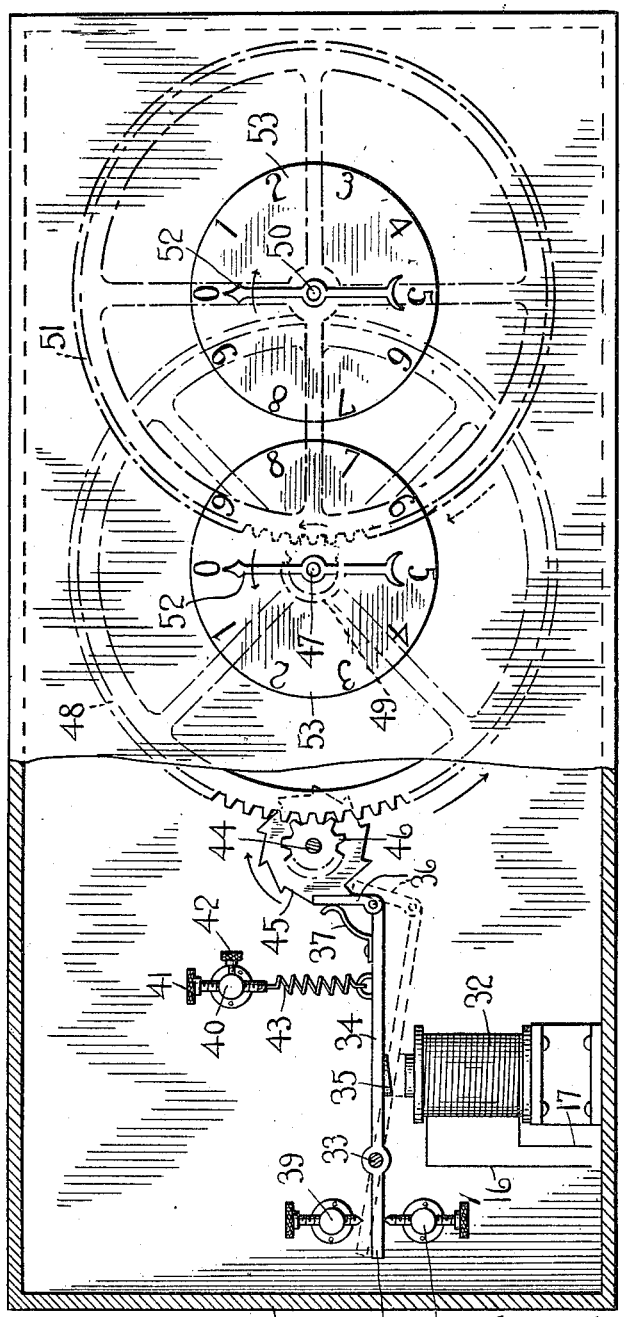
Fig. 3.
Witnesses
L. B. James
[signature]
Inventor
By [signature]
Attorneys

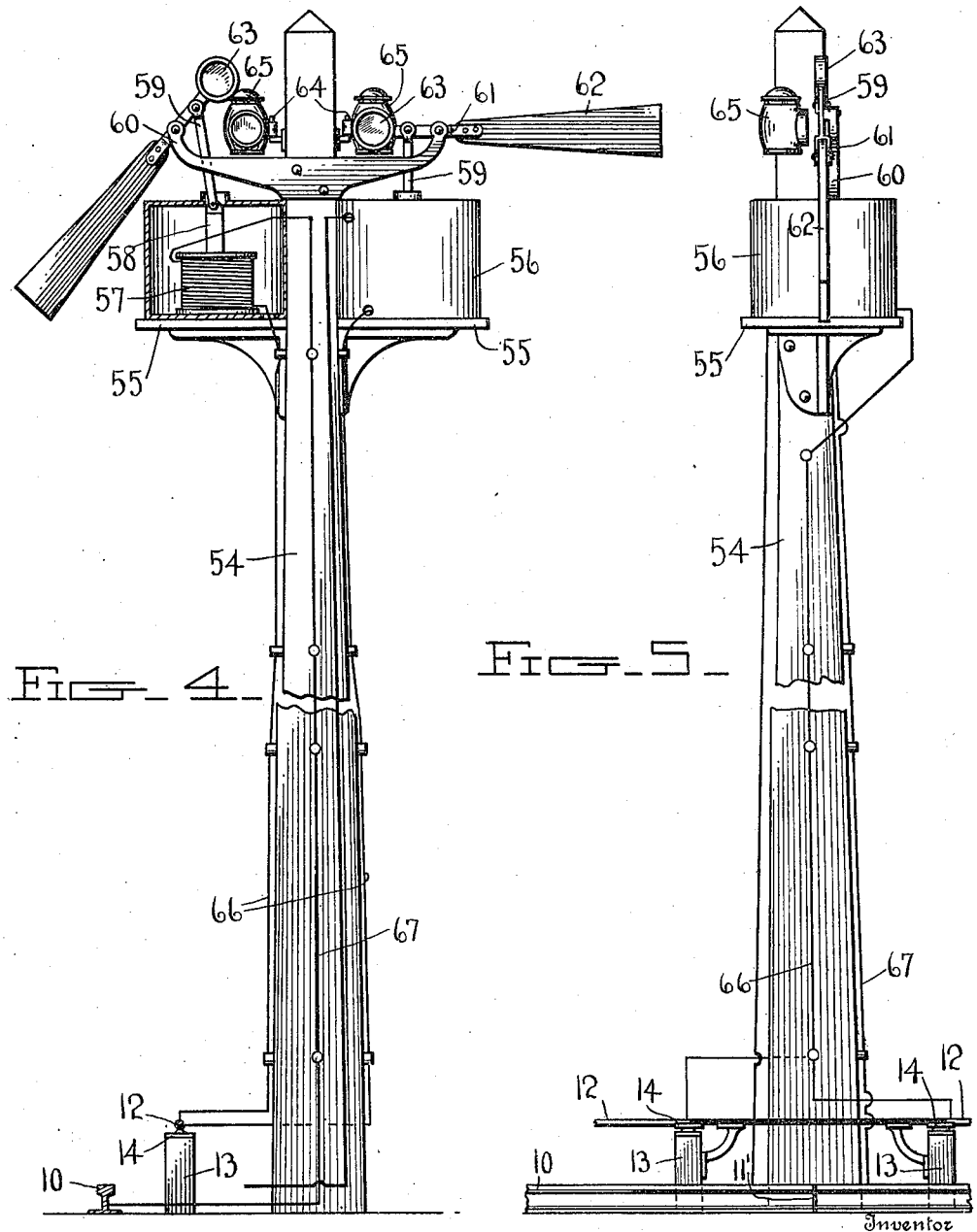

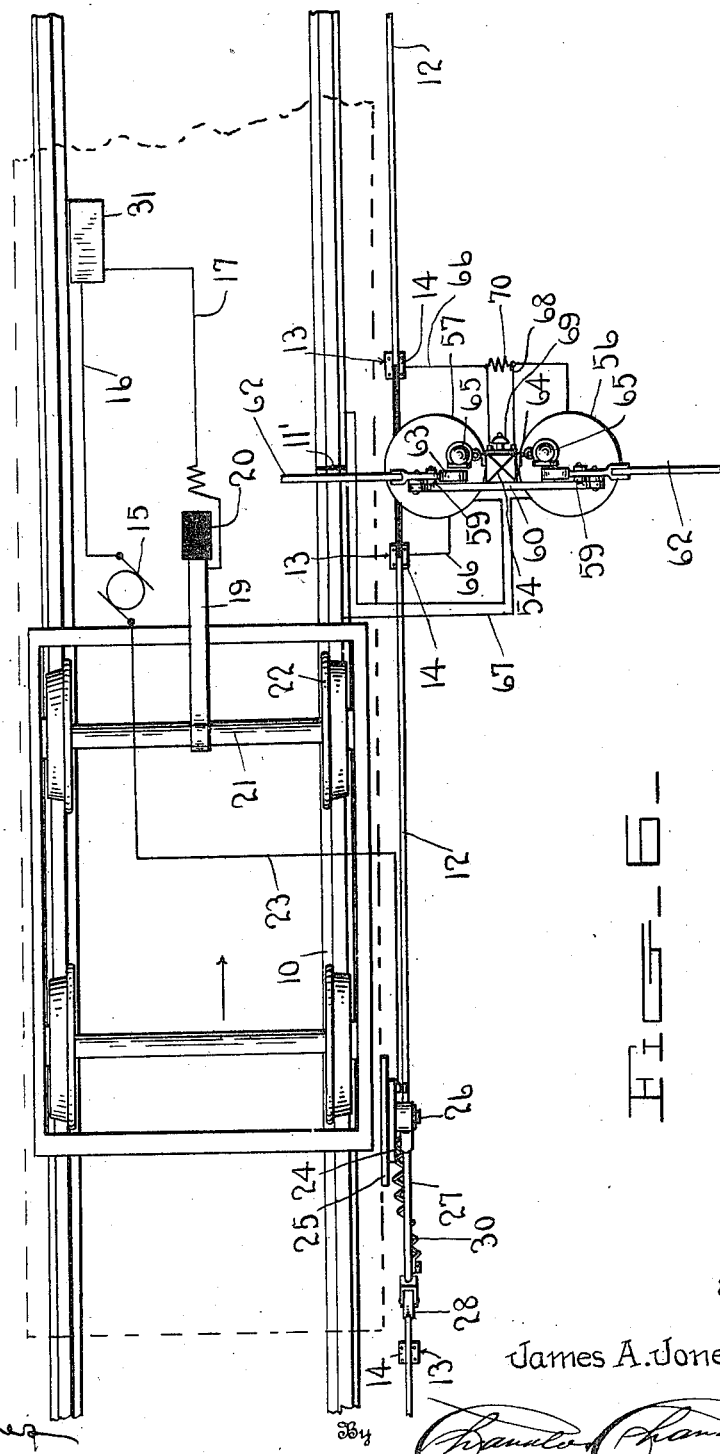

UNITED STATES PATENT OFFICE.

JAMES A. JONES, OF WARD, WEST VIRGINIA, ASSIGNOR OF ONE-HALF TO WILLIAM QUICK, OF WARD, WEST VIRGINIA.

SIGNALING SYSTEM FOR RAILWAYS.

974,800.  Specification of Letters Patent.  Patented Nov. 8, 1910.

Application filed November 9, 1908. Serial No. 461,800.

*To all whom it may concern:*

Be it known that I, JAMES A. JONES, a citizen of the United States, residing at Ward, in the county of Kanawha, State of West Virginia, have invented certain new and useful Improvements in Signaling Systems for Railways; and I do hereby declare the following to be a full, clear, and exact description of the invention, such as will enable others skilled in the art to which it appertains to make and use the same.

This invention relates to signaling systems and has a special reference to a signal system designed for railways and operated by electricity.

One object of the invention is to provide an improved form of automatic signal system operated by a current generated on the moving train.

Another object of the invention is to provide a means for automatically ringing an alarm during the presence of a train in a block.

A still further object of the invention is to provide, at a convenient point in the train or several convenient points an automatic mileage indicator actuated by the same current that operates the signals and alarm.

With the above and other objects in view as will be hereinafter apparent the invention consists in general of a source of electricity carried on the moving train, a conductor insulated from the ground, a conductor running from said source of electricity to a moving contact with the first mentioned conductor, a ground contact from said source of electricity, and suitable signal, alarm, and mileage recording instruments actuated by the current passing over said conductors.

The invention further consists in certain novel details of arrangement and combinations of parts hereinafter fully described, illustrated in the accompanying drawings, and specifically set forth in the claim.

In the accompanying drawings like characters of reference indicate like parts in the several views, and; Figure 1 is a diagrammatic view of a signal system constructed in accordance with this invention. Fig. 2 is a side elevation partly broken away of a baggage car provided with the generating mechanism and showing the connection to the insulated conductor. Fig. 3 is a detail elevation of the recording mechanism as supported in an engine cab or other convenient place on the train. Fig. 4 is a detail view of the signaling mechanism showing one of the poles supporting the semaphore blades. Fig. 5 is a similar view at right angles to Fig. 4. Fig. 6 is a plan view of the device, the view being partly diagrammatic.

Referring to the drawings the numeral 10 indicates the rails of an ordinary railroad track. These rails are preferably bonded together in the usual manner by any suitable form of bond as indicated at 11. At the end of each block the rails of one block are separated from the rails of the adjacent block by means of insulation 11'. At 12 is shown a wire supported adjacent the track and preferably on the inner side thereof. This wire is carried on a plurality of posts 13 provided with supporting insulators 14 at the upper ends thereof. Mounted within the car is a suitable source of electricity here indicated as a generator 15. This generator, while here shown as an ordinary type of rotating generator, may be replaced by a suitable storage battery or such other battery as may be found convenient. Leading from the generator 15 is a wire 16 which runs to the mileage recording instrument hereinafter to be described. Returning from this instrument is a wire 17. This wire is led through the bottom of the car and is connected by means of a binding post 18 to a contact spring 19 supported on an insulating block 20. This contact spring 19 is so arranged that it bears against the axle 21 of a pair of the wheels 22. Through this connection the wire 16 is grounded to the rails 10. From the opposite end of the motor 15 a wire 23 leads outward to a plate 24 mounted upon an insulating block 25 carried on the side of the car. Upon this plate 24 is formed a pin 26 whereon is supported a trolley arm 27 provided with a wheel 28 arranged to bear against the wire 12. The plate 24 is further provided with an arm 29 and the lower end of this arm is connected with the trolley arm 27 by means of a spring 30, the parts being so arranged that no matter whether the trolley is in the position indicated in the figure or in the opposite position as when the train is running in the opposite direction the trolley will be forced firmly against the wire 12. It will now be apparent that if the wire 12 be connected to the rails 10 and the generator rotated a current will be set up from the generator through the wire 12 and returning to the rails 10.

Referring now to the mechanism for recording the number of miles run by the train. There is located in any convenient position within the cab of the engine, or such other place as may be desired, a casing 31 wherein is mounted a magnet 32 in circuit with the wires 16 and 17. Upon a pin 33 in the casing is pivoted a lever 34 provided with an armature 35 arranged to position opposite the armature of the magnet 32 so that when the magnet is energized the armature end of the lever 34 is drawn downward. Upon this end of the lever is pivotally mounted a pawl 36 being normally pressed outward by means of a spring 37. The opposite end of the lever 34 is extended outward as indicated at 38 and suitable limit stops 39 are positioned opposite this end to limit the motion of the lever. In order to return the lever after the same has been drawn down by the magnet and the current broken there is provided a post 40 wherein is mounted a tension screw 41 held fixed in position by means of a set screw 42. The tension screw 41 is connected to the lever 34 by means of a spring 43. By this mechanism the proper tension is maintained on the spring to draw the same back when the current through the magnet 32 is broken. Mounted in the casing adjacent the pawl 36 is a shaft 44 whereon is mounted a ratchet of ten teeth as indicated at 45. This ratchet is so arranged as to be engaged by the pawl 36 and rotated thereby. The magnet 32 draws the lever downward and causes the engagement of the ratchet while the spring 43 causes the rotation of the same. Secured upon the shaft 44 is a pinion 46 and a similar shaft 47 supports a gear 48 which meshes with the pinion 46. The ratio of teeth of this pinion and gear is as one to ten for purposes hereinafter to be described. Upon the shaft 47 is also mounted a pinion 49. A shaft 50 is held in the casing and a gear 51 meshes with the pinion 49 and is supported on the shaft 50. The several shafts, 44, 47 and 50 extend through the casing and upon their outer ends are mounted a series of indicator arrows 52 each of which travels over a dial 53 having ten numerals stamped or otherwise formed thereon. It will be obvious that with this arrangement the center dial is in opposite arrangement to the two outside dials. It will also be obvious that this arrangement may be repeated as many times as necessary so that in place of three dials any number from one up may be used.

The wire 12 is arranged in blocks of one mile each and between the ends the same is insulated so that at the end of each mile there is a break in the current flowing through the wires 16 and 17 as the trolley wheel 28 passes over the insulated part. Until the trolley wheel strikes this insulated part the magnet 32 is energized throughout the running of the train and the pawl 36 is in position to rotate the ratchet 45. When the break occurs, as before described, the ratchet is rotated and the indicator arrow 52 attached thereto is moved forward one space, the next arrow being moved one tenth of a space and so on until the chain of wheels is completed. It is obvious that for other lengths of blocks the arrangement may be varied to suit the occasion.

At 54 is indicated the signal post. Upon this post is located a platform 55 which supports a casing 56. Within the casing 56 is positioned a solenoid 57 having a core 58 arranged to move therein. The core 58 is provided with a stem 59. Upon the pole 54 is supported a bracket 60 and pivotally supported upon the bracket is a semaphore arm 61 provided with a blade 62 on one end and the usual spectacle 63 upon the opposite end. A lamp hanger 64 is preferably mounted on the post above the spectacle frame and is arranged to support a lantern 65. A wire 66 connects the wire 12 with one end of the solenoid while a wire 67 connects the opposite end of the solenoid to the rail 10. In this manner the current is maintained through the solenoids as long as the train is in the block and the motor 15 continues to run. The result of this is that the solenoid core 58 is drawn down into the solenoid and the semaphore blade 62 is raised into the position shown on the right hand of Fig. 4. The above described apparatus on the pole may be duplicated on each side so that there is one of the semaphore arms actuated from each of the blocks. When this is so one of the arms will always be in the position shown on the left hand side of Fig. 4 so long as the train is not in the block. When the train passes from the previous block to the block for which that is the signal the arm will be raised as is the right arm of that figure while that arm will be allowed to fall by the breaking of the current through the solenoid controlling the same. For the purpose of warning the station master at a crossing there may be provided from the wire 66 a shunt 68 having a bell 69 located in its circuit. In order that the bell may be properly rung, suitable resistance 70 may also be interposed between the shunt points. With this arrangement as long as the semaphore arm is up and the current is flowing through the solenoid the bell will ring and continue to ring until the current is broken.

It is obvious that it will not be necessary to have this bell at places where there are no stations or crossings or other occasion for signaling by means of the bell. It is also obvious that the apparatus will work equally well without the bell as with the same.

There has thus been provided a very simple device of the kind described and one which will not only positively block a railroad but will also indicate to the engineer or other train hand the exact position of the train on foggy nights and at other times when the ordinary signals cannot be seen. Furthermore by the use of this apparatus the engineer or train hand is immediately made aware of any defect in the system by the failure of the recording mechanism to register.

It is obvious that many minor changes may be made in the form and construction of the various parts described and it is not therefore desired to confine the invention to the exact form herein shown and described. It is wished, however, to include all such as properly come within the scope of the invention.

Having thus described the invention, what is claimed as new, is:—

The herein described railway signaling system comprising a series of track sections each insulated from the adjacent track sections, track signal devices connected to said sections, a trolley wire for each section, connected electrically thereto and also electrically connected to the track signal devices, a car having a trolley and an electrical contact device to respectively engage said trolley wires and said track sections as the car proceeds, a car-carried generator, one pole of which is connected to said trolley and a car-carried indicating instrument having an actuating electro-magnet, the winding of which is connected electrically to the other pole of the generator and to the said electrical contact device.

In testimony whereof, I affix my signature, in presence of two witnesses.

JAMES A. JONES.

Witnesses:
WILLIAM QUICK,
MAGGIE BANISTER.